United States Patent [19]

Mullender

[11] 4,398,988
[45] Aug. 16, 1983

[54] TIRE BUILDING APPARATUS

[75] Inventor: Claude Mullender, Barberton, Ohio

[73] Assignee: The B. F. Goodrich Company, New York, N.Y.

[21] Appl. No.: 339,805

[22] Filed: Jan. 15, 1982

[51] Int. Cl.³ .................. B29H 17/20; B29H 17/18
[52] U.S. Cl. .................. 156/405.1; 83/555; 156/412; 156/447; 156/512; 226/95; 226/170; 242/55; 242/DIG. 3; 493/462
[58] Field of Search .............. 156/405.1, 406, 412, 156/406.2, 406.4, 406.6, 414, 447, 395, 512; 242/DIG. 3, 55; 493/462; 271/69, 191, 198; 226/158, 95, 170; 83/555

[56] References Cited

U.S. PATENT DOCUMENTS

| | | | |
|---|---|---|---|
| 3,057,397 | 10/1962 | Riddle et al. | 156/405.1 |
| 3,556,902 | 1/1971 | Cole | 156/412 |
| 3,841,941 | 10/1974 | LeBlond et al. | 156/405.1 X |

Primary Examiner—William A. Powell
Assistant Examiner—Thomas Bokan
Attorney, Agent, or Firm—Joseph Januszkiewicz

[57] ABSTRACT

An apparatus for automatic applying a predetermined length of ply stock onto a tire building drum wherein the ply stock is unwound from a supply source, conveyed in an untensioned condition on a conveyor means, cut to length and the delivered to a tire building drum. The cut stock is then wrapped in an untensioned condition about the drum with the aid of the conveyor means.

10 Claims, 12 Drawing Figures

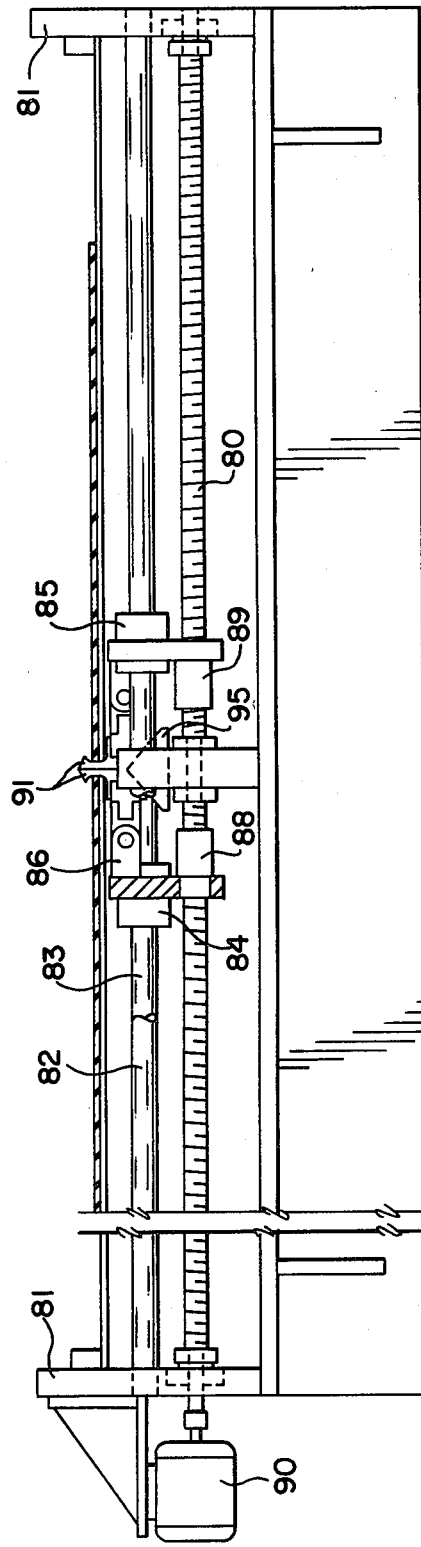
FIG. 10
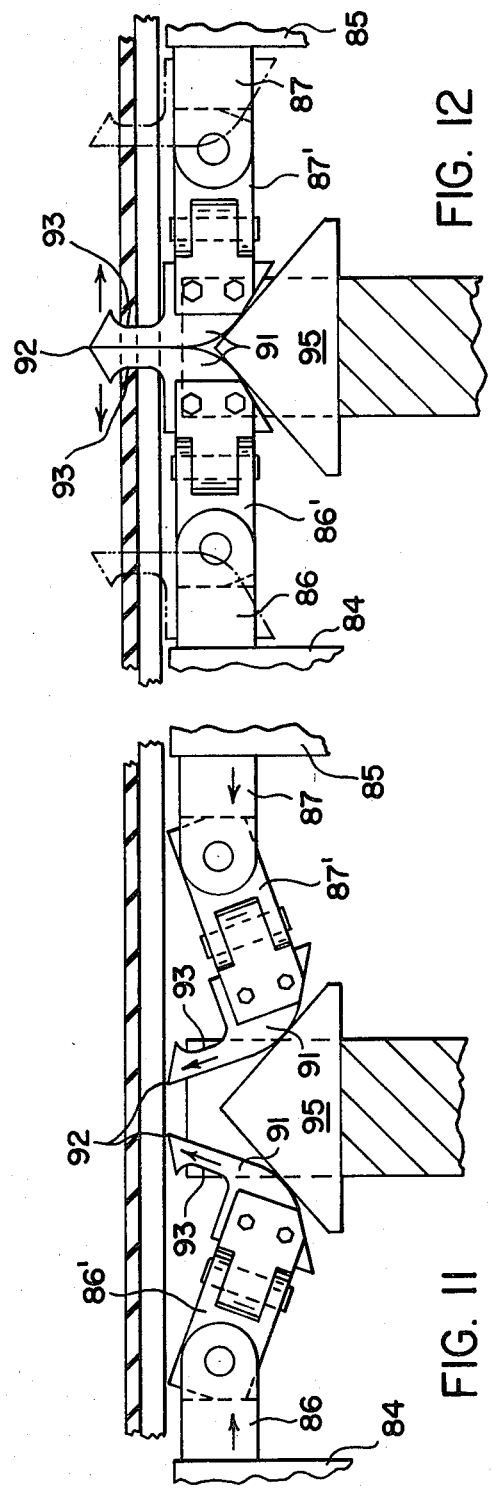
FIG. 12
FIG. 11

TIRE BUILDING APPARATUS

BACKGROUND OF THE INVENTION

This invention relates to a tire building apparatus for tire building machines generally, and more particularly to an apparatus and method for applying plies of fabric or liners to a tire building drum.

It is important in the fabrication of vehicle tires that the several lengths of material in ply form which make up the assembled tire carcass be applied to the tire building drum in an untensioned, undistorted condition and in proper alignment to achieve satisfactory quality of performance of the finished tire. It is also desirable that the respective splices of the different overlying plies be spaced from each other in a precise predetermined relationship to ensure proper weight distribution and insure safety. The present invention achieves these objectives in a facile manner with an apparatus that automates the process to insure high quality construction of tire carcasses.

SUMMARY OF THE INVENTION

The present invention is directed to an apparatus for applying a predetermined length of ply stock in an untensioned condition onto a tire building drum with the use of an endless conveyor belt. The conveyor belt acts as a carrier member that delivers the ply stock to the tire building drum, thence the conveyor belt with the ply stock thereon is wrapped around the tire building drum as the drum rotates to apply the stock onto the drum. With the conveyor belt then in its fully advanced position, the drum is rotated while the conveyor belt is moved in its endless path to complete the application of the ply stock.

DESCRIPTION OF DRAWINGS

FIG. 10 is a front elevational view of the power drive means for the ply stock cutter taken on line 10—10 of FIG. 1.

FIG. 11 is a fragmentary front view of the ply stock cutter in the inactive position contacting a cam in preparation for being actuated to a cutting condition.

FIG. 12 is a fragmentary front view of the ply stock cutter in the cutting position.

DESCRIPTION OF THE PREFERRED EMBODIMENT

Figure 1:
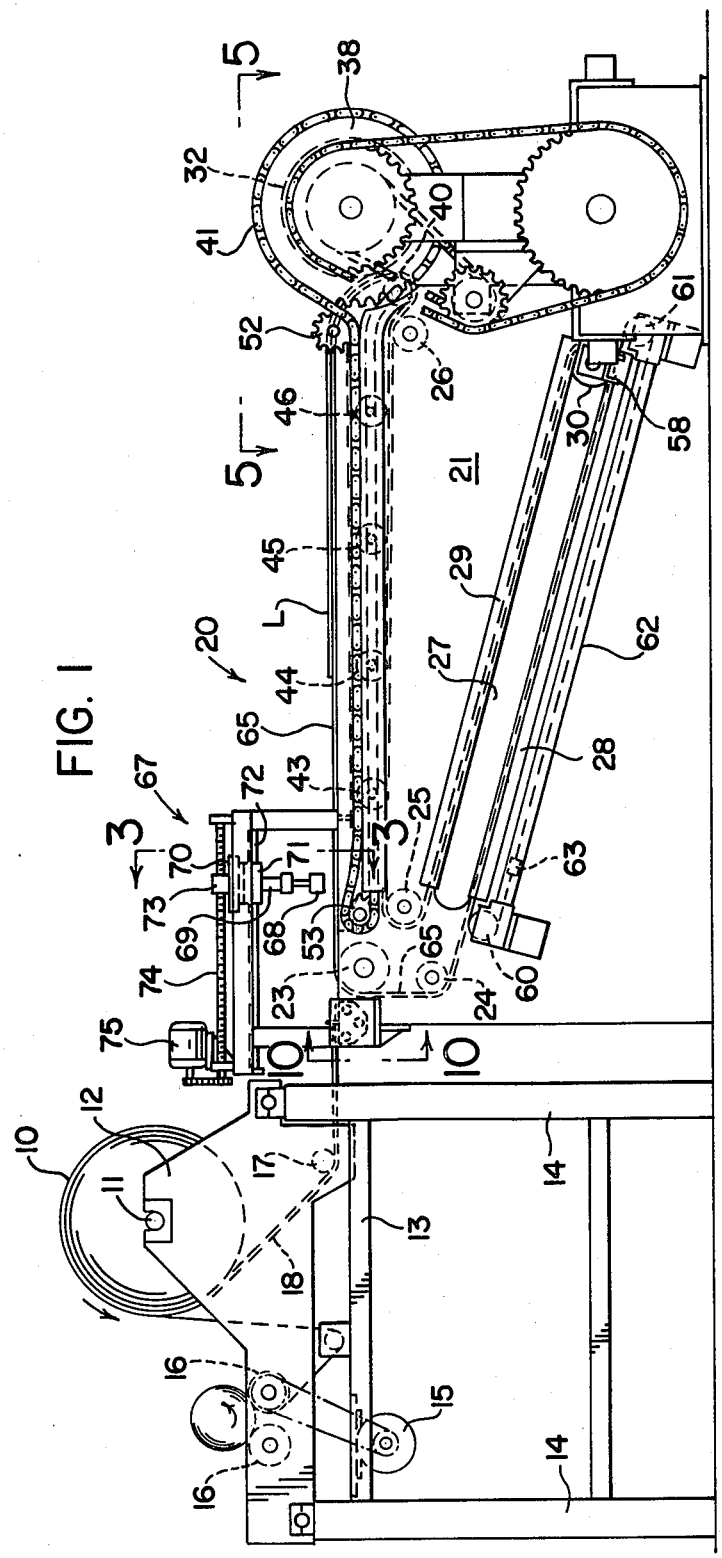
FIG. 1 is a side elevational view of a tire building apparatus.

Referring now to the drawings, wherein like reference numerals designate like or corresponding parts throughout the several views, there is shown in FIG. 1, a supply roll 10 journaled on shaft 11 which is mounted between a pair of spaced side supports 12 that in turn are supported by a frame structure 13 having a plurality of leg supports 14. A motor 15 is suitably mounted on the structure 13, driving a pair of rollers 16 for winding up a liner from the supply roll 10 having ply stock 18 therein. The ply stock 18 from the supply roll 10 is fed under an idler roller 17 and is directed to a conveyor feed table 20.

Figure 4:
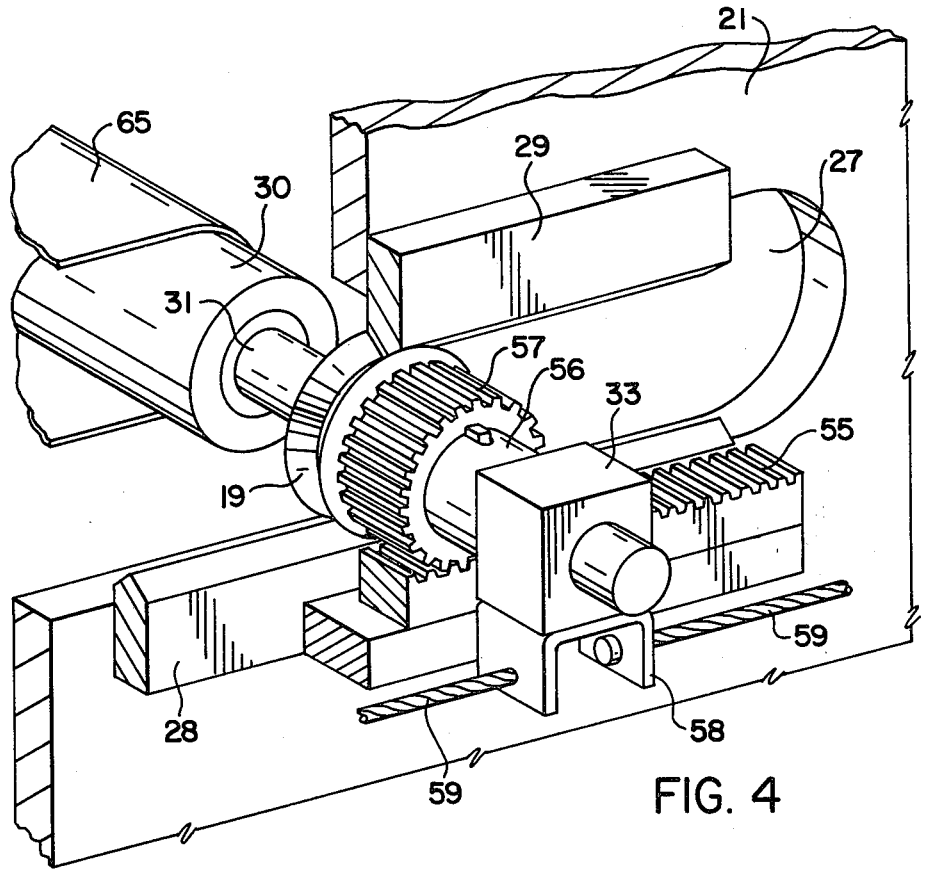
FIG. 4 is an enlarged perspective view of one of the end rolls for the ply stock conveyor journaled on a rack.
Figure 5:
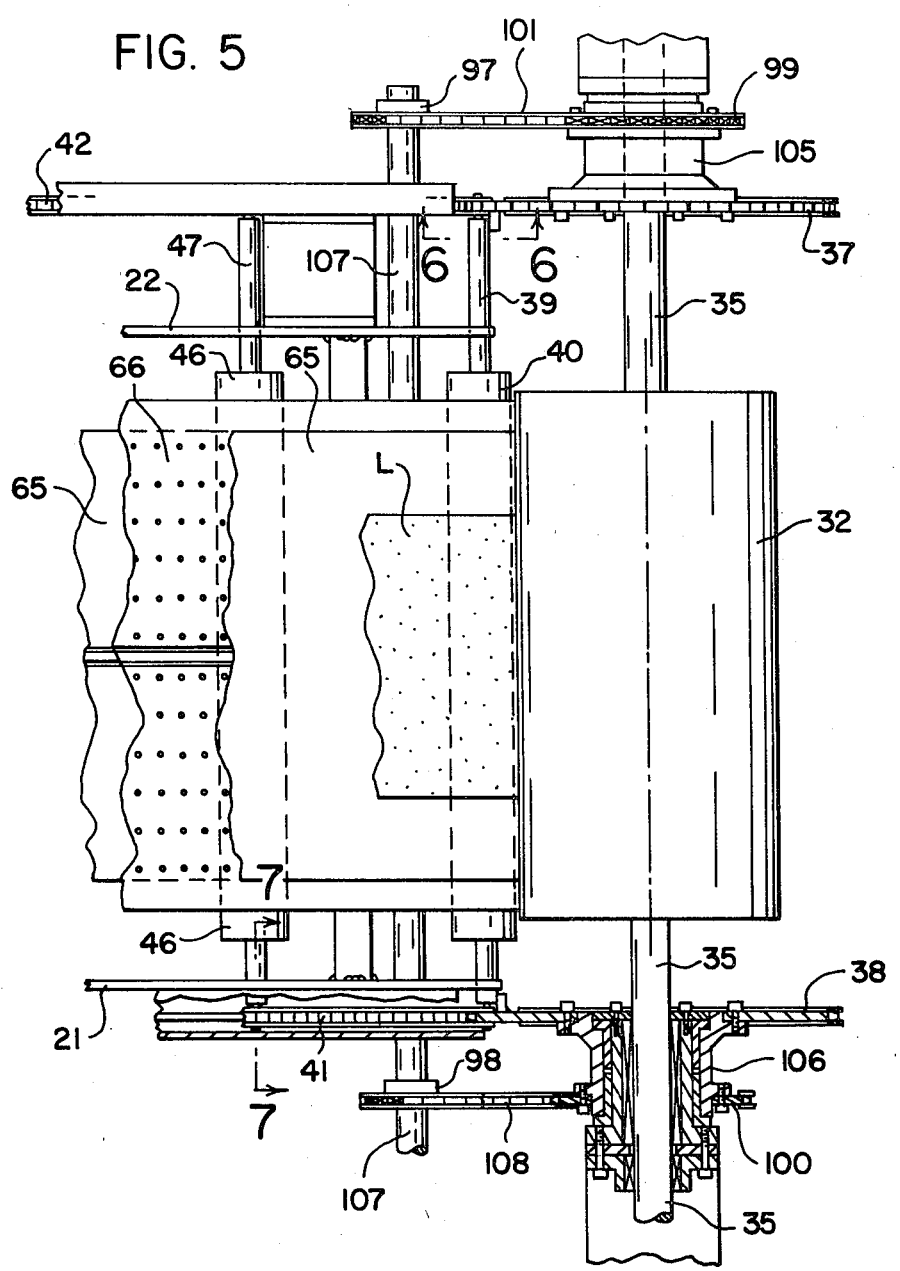
FIG. 5 is a plan view of the forward portions of the tire building apparatus showing the tire building drum as taken on line 5—5 of FIG. 1.
Figure 6:
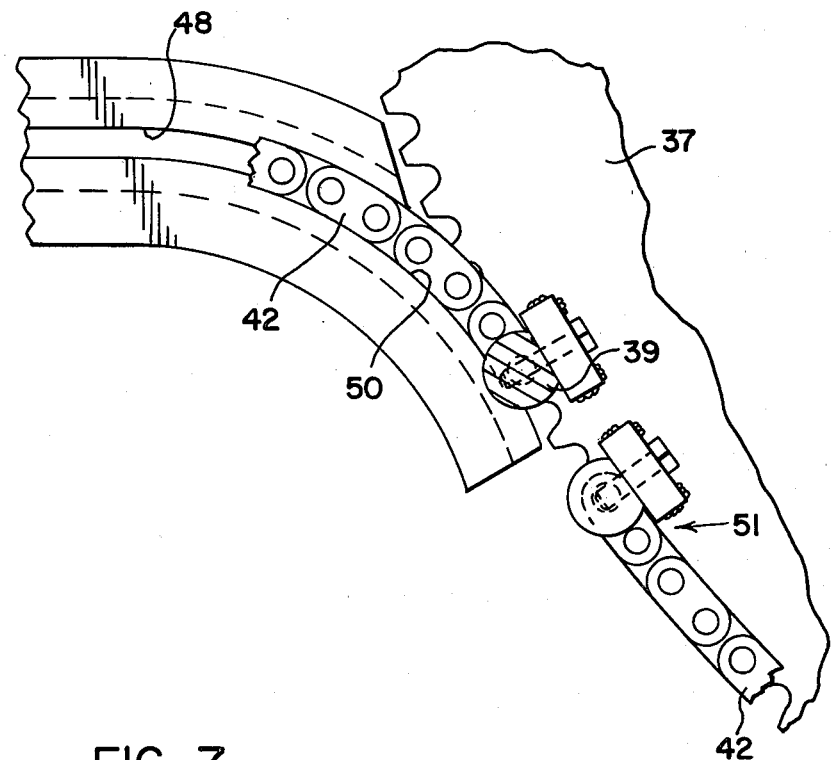
FIG. 6 is an enlarged side elevational view of the conveyor chain drive and its connection to the tire building drum taken on line 6—6 of FIG. 5.
Figure 7:
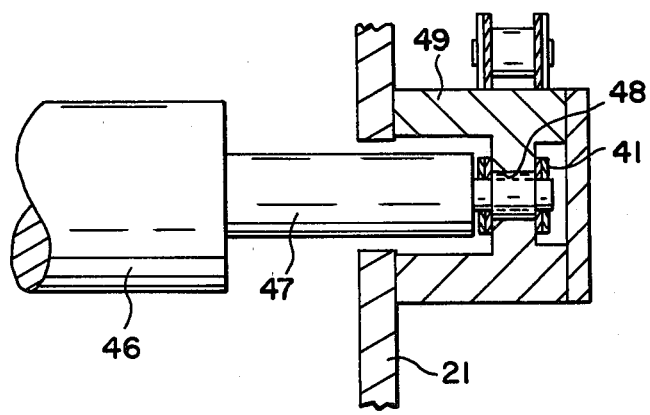
FIG. 7 is a partial cross-sectional view of a roller and the conveyor chain in a guideway taken on line 7—7 of FIG. 5.
Figure 8:
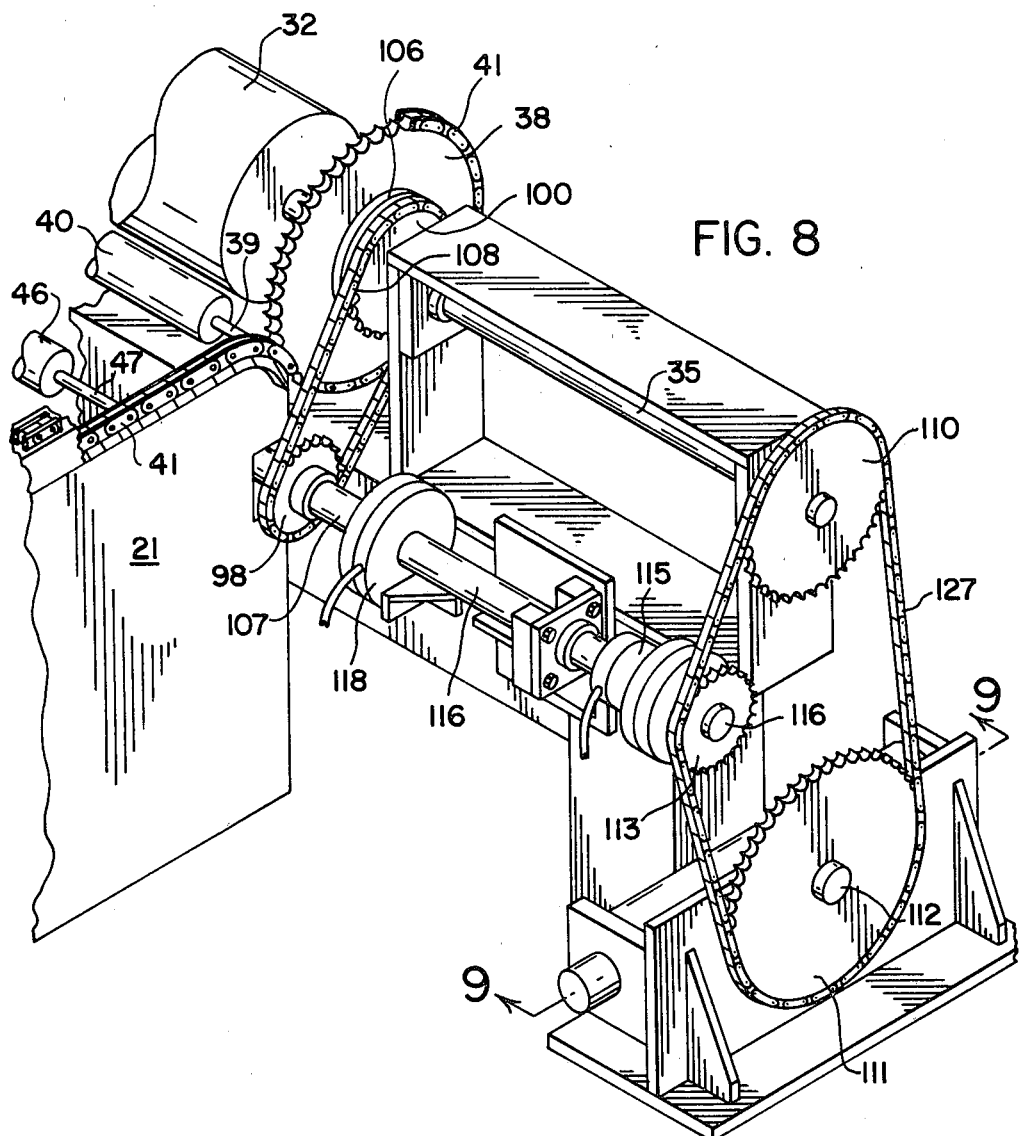
FIG. 8 is a perspective view of the drive means for the tire building drum and the belt ring.

Conveyor table 20 has a pair of spaced side supports 21 and 22 journaling for rotation rollers 23, 24, 25 and 26. The respective side supports 21 and 22 have an elongated slot 27 extending from the lower front end portion upwardly and rearwardly towards the roller 23. As seen in FIG. 4 a pair of opposed guide bars 28 and 29 are suitably attached along the slot 27 to act as a guideway for grooved rollers 19 (only one shown). An elongated conveyor roller 30 is journaled on a shaft 31 which in turn is journaled in a block 33. Although only the slot 27 in side support 21 was described, the slot in side support 22 is similarly constructed. Mounted on suitable supports forwardly of support 21 and 22 is a tire building drum 32. Drum 32 is suitably keyed to a shaft 35, which shaft 35 has journaled on it spaced sprocket gears 37 and 38 also referred to as belt rings. A cross bar 39 (FIGS. 5, 6 and 8) with a roller 40 freely journaled thereon is connnected to the respective belt rings or gears 37 and 38 for movement therewith. Cross bar 39 has its respective ends suitably connected to sprocket chains 41 and 42, which sprocket chains engage and are trained around sprocket gears 38 and 37 respectively. Located along the upper top portions of side supports 21 and 22 are a plurality of spaced rollers 43, 44, 45 and 46. All of such rollers are similar in construction and are journaled on shafts that are connected to sprocket chains 41 and 42 for movement therewith. Only roller 46 will be described, it being understood that the other rollers 43 through 45 are similar in operation and construction. Roller 46 is journaled on a shaft 47 whose respective end portions are suitably connected to chains 41 and 42 (FIGS. 5 and 7). Chain 41 is journaled for linear movement along a guideway 48 in bracket 49, which bracket 49 is connected to side suppport 21. Guideway 48 terminates adjacent sprocket gear 38 and presents an arcuate surface 50 guiding chain 41 onto sprocket gear or belt ring 38 as it rotates. Closely adjacent to cross bar's 39 connection to sprocket 38, chain 41 has another end portion connected thereto as at 51 such that chain 41 encircles the sprocket 38 and has a return run underneath idler sprocket 52. Chain 41 extends rearwardly along the upper portion of bracket 49 for movement over idler sprocket 53 and thence forwardly along guideway 48 for connection to the respective shafts of idler rollers 43-44-45 to roller 46 and connection to sprocket 38. Thus as sprocket gear 38 is rotated, the chain 41 will move along with it pulling the respective rollers 43, 44 and 45 along the guideway 48 until rollers 43, 44 and 45 via the chain 41 rotate around the tire building drum 32. The idler sprockets 53 and 52 are stationary. The sprocket chain 42 is similar in construction, being connected to the shafts that journal rollers 43, 44, 45 and 46 and is trained around sprocket 37, under an idler sprocket corresponding to idler sprocket 52 thence over and around an idler sprocket corresponding to idler sprocket 53.

A rack 55 is secured to the respective side supports 21 and 22 (only one shown in FIGS. 1 and 4) along guide bars 28. Shaft 31 has journaled thereon a sleeve 56 that has keyed thereto spur gear 57. Thus linear movement of gear 57 does not affect rotation of roller 30. U-shaped bracket 58 is connected to the lower end of block 33. The respective ends of bracket 58 are connected to the ends of a wire 59, which in turn is trained about idler rollers or pulleys 60 and 61. A pneumatic cylinder 62 is mounted between rollers 60 and 61 having a piston guide member 63 therein and suitably connected to the wire 59 to provide proper tensioning and a positive return to the spur gear 57 and the shaft 31. Pressurization of the cylinder 62 will operate to rotate spur gears 57 and sleeve 56 to move such sleeve 56 in a linear direction on rack 55. Such cylinder 62 and wire 59 along with spur gear 57 act as a power operated drive means for roller 30. A flexible endless conveyor belt 65 journaled around roller 40 has one end directed rearwardly therefrom over a vacuum box 66 thence around rollers 23 and 24 and thence directed downwardly and forwardly under and over a roller 30 journaled on shaft 31 and block 33. Such belt 65 is then directed rearwardly and upwardly as viewed in FIG. 1 over roller 25 and thence forwardly to roller 40. As seen in FIG. 1, the conveyor belt 65 rest closely adjacent to the tire drum 32 for delivering ply stock thereto in a manner to be described. Such conveyor belt 65 acts as a ply applier.

Ply stock transfer means for delivering ply stock from supply roll 10 to the conveyor belt 65, the ply stock applier, includes a pick up and transport means 67 having a vacuum head 68 suitably attached to a pair of hydraulic cylinders 69. A carriage 70 has a pair of spaced guide bosses 71 secured thereto with bores therethrough slidingly engaging parallel rods 72 for maintaining alignment of the carriage as it reciprocates on guide rods 72. A nut 73 secured to carriage 70 threadedly engages a lead screw 74 that is suitably journaled on brackets secured to the structural framework of the ply transfer means. A motor 75 is suitably mounted adjacent lead screw 74 and provides a power supply to lead screw 74 whereby carriage 70 is controlled in its reciprocal movement on guide rods 72. Upon extension of the vacuum head 68 by actuation of cylinders 69, the vacuum head 68 is able to engage and transport the forward portion of a ply stock onto conveyor belt 65. Vacuum head 68 releases the ply stock and returns to its rearward position under control of motor 75 in preparation for a succeeding deliver of the ply stock. Upon delivery of the ply stock to the conveyor belt 65, the conveyor belt 65 is then in a position to advance the ply stock. The conveyor belt 65 has a plurality of holes throughout its length such that when a vacuum is drawn in vacuum box 66 the material overlying belt 65 will adhere to the conveyor belt and will be transported therewith upon linear advance or movement of the belt.

Conveyor belt 65 has two types of independent movement. The belt roller 23 is suitably connected to a drive motor 76 which upon energization rotates roller 23 and drives the conveyor belt 65 in an endless loop across the vacuum box 66, around roller 40, thence across the bottom of rollers 46, 45, 44 and 43, thence over and around roller 25 for movement around roller 30, thence upward around roller 24 to roller 23. This energization of motor 76 is used to advance the ply stock delivered to such roller for positioning the ply stock at the edge of the tire drum 32 in preparation for applying such stock to the tire building drum 32.

Ply stock cut off means for severing the ply stock include a lead screw 80 having portions thereof of opposite threads supported at the respective ends by bracket 81. Also journaled on brackets 81 are a pair of guide rods 82 and 83. A pair of spaced bosses or slides 84 and 85 are slidably mounted on guide rods 82 and 83 and operatively connected to the lead screw 80 via threaded nuts 88 and 89 respectively. Lead screw 80 is connected to a motor 90 which upon energization causes the slides 84 and 85 to move selectively toward each other or away from each other. The respective slides 84 and 85 have laterally extending brackets 86 and 87 pivotally supporting tool supports 86' and 87' which in turn carry knives or cutters 91 with apexes 92 and laterally disposed cutting edges 93. Located centrally on a support in alignment with the pivotally mounted cutters 91 is a cam 95 which is adopted to engage the apex of cutters 91 as shown in FIG. 11 and pivot them upwardly into the position shown in FIG. 12 to pierce the center of the ply stock. The laterally disposed cutting edges 93 of the pair of cutters glide on top of the ply stock and cut the ply stock as they are moved laterally away from the center of the ply stock by slides 84 and 85 upon energization of motor 90.

Journaled on the respective outer ends of shaft 35 is sleeves 105 and 106. Sleeve 105 is operatively secured to sprocket or belt ring 37 and sprocket 99, which sprocket 99 is driven by sprocket 97 via chain 101. In a similar manner sleeve 106 is operatively attached to sprocket 38 or belt ring 38 and sprocket 100 which in turn is connected to sprocket 98 via chain 108. Both of the sprockets 97 and 98 are keyed to a shaft 107.

Shaft 35 which has the tire building drum 32 secured thereto, also has a sprocket 110 keyed thereto. Mounted in vertical alignment with sprocket 110 is a lower sprocket 111 keyed to a shaft 112 and an intermediate sprocket 113. Sprocket 113 keyed to a shaft 116 is connected to a clutch mechanism 115. A brake mechanism 118 is connected between axially aligned shaft 107 and 116 to selectively transfer power from shaft 116 to shaft 107. Vertically aligned sprockets 110, 111 and 113 are interconnected by a sprocket chain 127.

Sprocket 111 and its shaft 112 are keyed to a gear 120 which in turn meshes with gear racks 121 and 122. Racks 121 and 122 are moved linearly a predetermined amount by the pressurization of pneumatic cylinders 125 and 126 which have their ouput shafts connected to gear racks 121 and 122 respectively. By the pressurization of the respective head ends of cylinders 125 and 126, sprocket 111 is rotated which in turn via chain 127 rotates sprockets 113 and 110, which in turn rotates shafts 116 and 35 which in turn rotate the tire building drum 32 and the sprockets or belt rings 37 and 38 in the same direction at the same angular velocity. Since cross bar 39 with roller 40, which is attached to belt ring or sprocket 38, rotate with the tire building drum 32, the tire building material L which had been deposited on the conveyor 65 will be advanced a predetermined amount such that the fabric material will be wrapped around the tire building drum 32.

In the operation of the above described apparatus, assume that the ply stock L after being cut by the cutters 91 is resting on the conveyor belt 65 with its leading edge closely adjacent roller 23. The vacuum head 68 on carriage 70 is lowered, with a vacuum being drawn therein such that vacuum head 68 picks up the ply stock. The vacuum head is then raised and motor 75 is thence energized to advance the carriage 70 and the ply stock therewith to its forwardmost position, where the vacuum head 68 is lowered and the vacuum released to position the forward portion of the ply stock onto the conveyor belt 65 and over the vacuum box 66 therebelow. The carriage 70 along with vacuum head 68 is then returned to its rearward most position for the next cycle of operations. Motors 76 and 15 which control the advance of conveyor 65 and the ply stock letoff are both energized thereby advancing a predetermined length of ply stock. Motor 90 is then energized to rotate lead screw 80, advancing slides 84 and 85 toward each other until the cutters 91 engage the cam 95 and are pivoted upwardly to pierce the ply stock as shown in FIG. 12. Motor 90 is then energized to rotate the lead screw 80 in a reverse direction whereby slides 84 and 85 move away from each other whereby the cutters 91 cut the ply stock as they are moved laterally away from each other thereby cutting a predetermined length of ply stock L. Motor 76 is then energized while a vacuum is maintained in vacuum box 66 to advance the ply stock L on endless conveyor belt 65 until the forwardmost edge of the ply stock is adjacent tire building drum 32.

Figure 2:
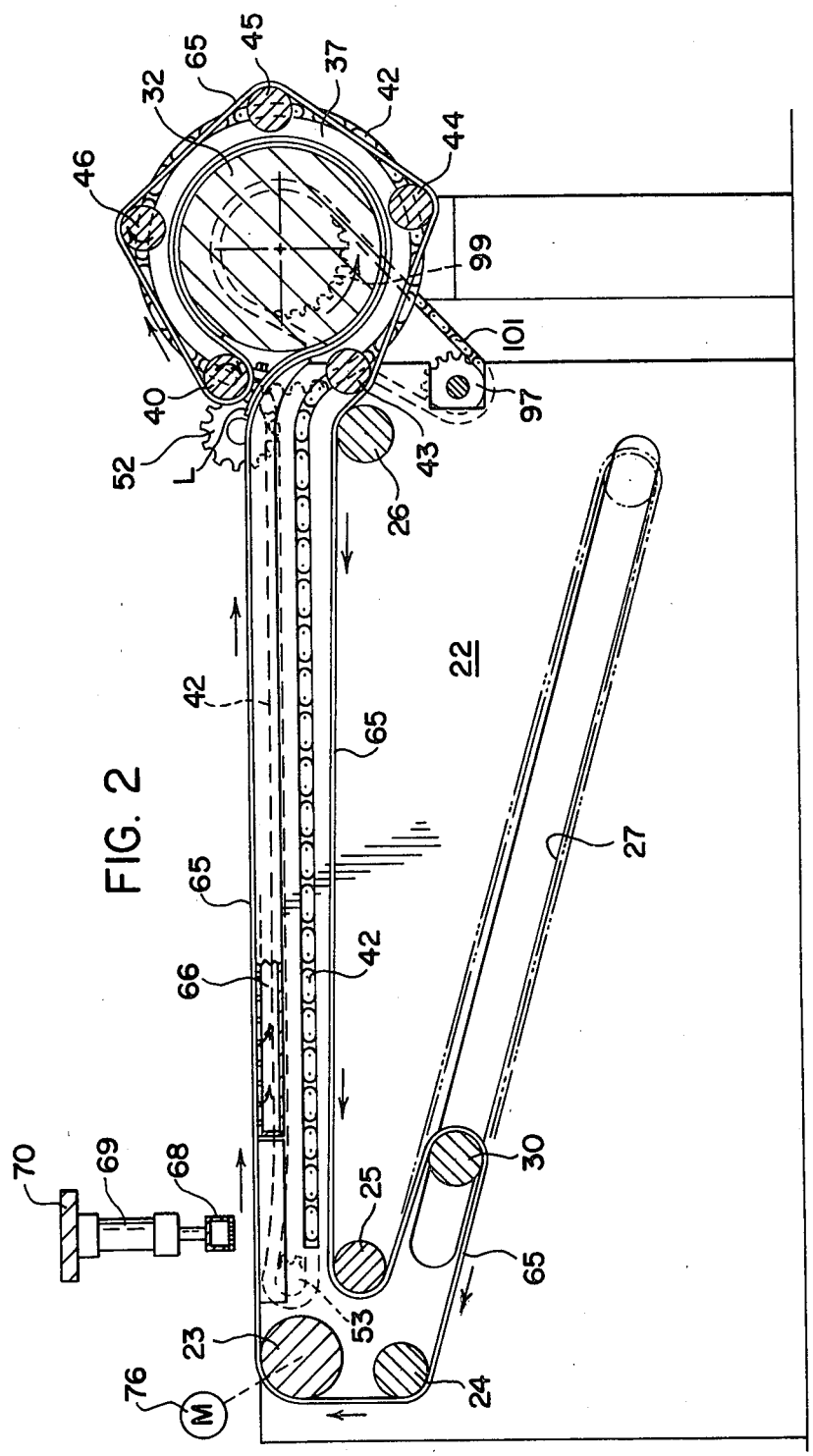
FIG. 2 is a schematic showing in side elevation of the tire building apparatus shown in FIG. 1 with the ply applier fully advnaced for the application of a ply stock on the tire building drum.
Figure 3:
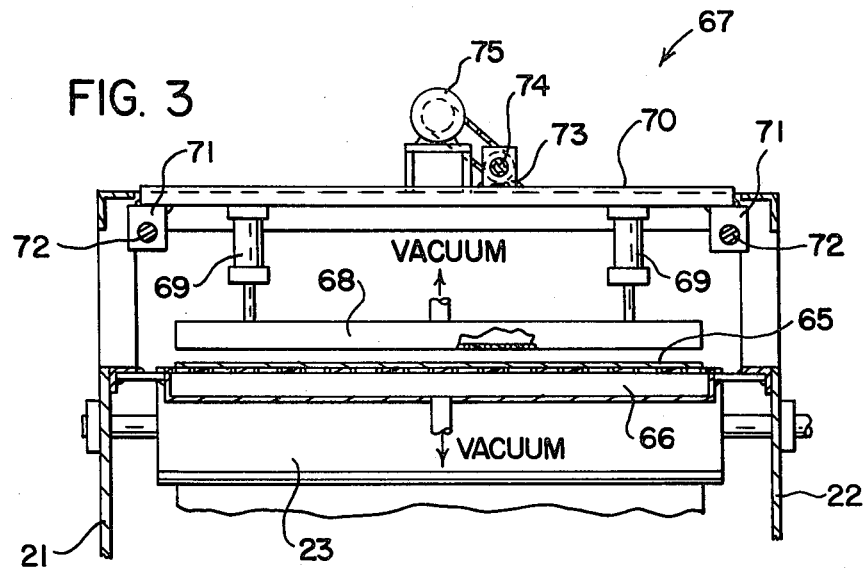
FIG. 3 is a partial front elevational view of the ply stock pick up apparatus taken on line 3—3 of FIG. 1.
Figure 9:
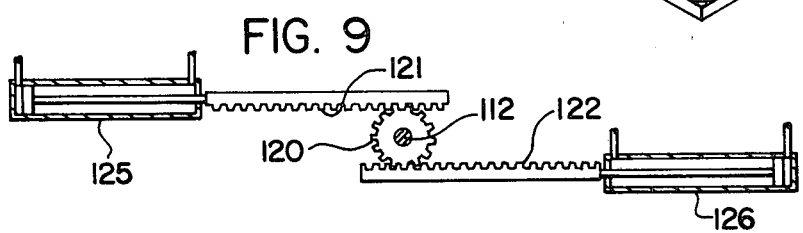
FIG. 9 is a schematic showing of the power output for the drive means taken on line 9—9 of FIG. 8.

Cylinders 125 and 126 are then pressurized thereby rotating sprockets 111, 113 and 110 which in turn rotate shafts 35 and 116 (Clutch 115 engaged and brake 118 disengaged). Shaft 116 provides a rotation to belt rings 37 and 38 simultaneously with tire building drum 32. As the drum 32 rotates it carries end roller 40 with it in a circumferential direction along with the sprocket chains 41 and 42 and the rollers 43, 44, 45 and 46. With this action roller 30 which carries one end of the belt conveyor is moved upwardly along slot 27 to the position shown in FIG. 2 until tire building drum 32 (and shaft 35) and belt rings 37 and 38 have rotated 310°. Either by a counter mounted on the ends of shafts 116 or 35 or by other suitable electronic means as an electric eye, brake means 118 is energized to stop rotation of shaft 107 thereby permitting drum 32 to continue to rotate. Since the drum 32 frictionally contacts the conveyor belt 65, continued rotation of drum 32 will continue to cause the conveyor belt 65 to rotate with it as an endless belt which will permit the remaining portion of the ply stock to be applied circumferentially around the drum to effect a splicing of the ply stock. The tire building drum can be programmed to rotate a predetermined amount by the length of stroke that the racks 121 and 122 impart thereto, thereby placing the spliced portion of the ply stock at a predetermined location so that the next application of the ply stock has its spliced portion at a predetermined position relative to the prior splice and succeeding splices to provide a tire carcass body that will be dynamically balanced. Upon reversal of movement of the racks 121 and 122 away from each other to the position shown in FIG. 9 simultaneously with the pressurization of cylinder 62, drum 32 along with roll 30 will be returned to their starting position as shown in FIG. 1 from that shown in FIG. 2.

It will be apparent that although a specific embodiment of the invention has been described, the invention is not limited to the specifically illustrated and described construction since variations may be made without departing from the principles of the invention.

I claim:

1. In an automatic ply applier having a support means, ply stock supply means mounted on one end of said support means, a shaft mounted on the other end of said support means, a tire building drum mounted on said shaft, belt drive rings journaled on said shaft for rotation thereon, a plurality of rollers mounted on said support means, an idler roll mounted on said belt rings for rotation therewith around said shaft, an endless conveyor means mounted on said support means and trained about said rollers and said idler roll, one of said plurality of rollers being moveable in a linear direction, and power operated means connected to said drum and said belt rings to selectively rotate said drum and said belt rings in synchronism for a first predetermined amount of rotation followed by the sole rotation of said drum a second predetermined amount, and said drum being in frictional contact with said endless conveyor means to transfer ply stock from said conveyor means to said drum upon continued rotation of said drum to effect a wrapping around of the ply stock resting on said conveyor means about said drum during actuation of said power operated means.

2. In an automatic ply applier as set forth in claim 1 wherein said idler roll is moved in an arcuate direction around said drum as said belt rings rotate and said drum rotate while said one roller is moved in a linear direction to compensate for the distance traveled by said idler roll.

3. In an automatic ply applier as set forth in claim 2 wherein cutter means are mounted on said one end of said support means for severing ply stock delivered to said conveyor means.

4. In an automatic ply applier as set forth in claim 3 wherein transfer means are mounted on said one end of said support means for effecting a transfer of ply stock after being cut by said cutter means to said conveyor means.

5. In an automatic ply applier as set forth in claim 4 wherein said conveyor means comprises an endless belt with a plurality of holes therein, said endless belt has an upper conveying run and a lower return run, and a vacuum box mounted beneath said conveying run of said endless belt to retain ply stock thereon in an untensioned condition while being conveyed by said endless belt.

6. In an automatic ply applier as set forth in claim 5 wherein said transfer means includes a carriage moveable linearly between said one end of said support means to said vacuum box, a vacuum pickup means mounted on said carriage for movement therewith and power operated cylinder means mounted on said carriage and connected to said vacuum pickup means for selectively raising and lowering said pickup means to effect a transfer of ply stock on said conveyor means.

7. In an automatic ply applier having support means, ply stock supply means mounted on one end of said support means, a tire building drum mounted on the other end of said support means, a belt ring journaled on each end of said drum, drive means connected to said tire building drum and said belt rings for selectively rotating said drum and rings simultaneously and thence rotating said drum relative to said rings, an idler roller journaled for rotation on said belt rings and for arcuate movement therewith, a plurality of rolls mounted on said support means, endless conveyor belt means trained on said rolls and said idler roller for movement thereon, motive means operably connected to said endless conveyor belt means for moving said belt in an orbital movement, certain ones of said rolls mounted for linear movement on said support means and for rotation around said belt rings in cooperation with rotation of said idler roller with said belt rings to wrap a portion of said endless belt means about said drum by said drive means, cut-off means mounted on said one end of said support means for severing a predetermined length of ply stock on said conveyor belt means.

8. In an automatic ply applier as set forth in claim 7 wherein said drive means rotates said drum and said belt rings simultaneously for less than 360° but rotates said drum for at least a full revolution to provide a splicing of a ply stock.

9. In an automatic ply applier as set forth in claim 8 wherein said conveyor means comprises an endless belt with a plurality of holes therein, said endless belt has an upper conveying run and a lower return run, and a vacuum box mounted beneath said conveying run of said endless belt to retain ply stock thereon in an untensioned condition while being conveyed on said endless belt.

10. In an automatic ply applier as set forth in claim 9 wherein said transfer means includes a carriage moveable linearly between said one end of said support means to said vacuum box, a vacuum pickup means mounted on said carriage for movement therewith and power operated cylinder means mounted on said carriage and connected to said vacuum pickup means for selectively raising and lowering said pickup means to effect a transfer of ply stock on said conveyor means.

* * * * *